(12) United States Patent
Suenaga

(10) Patent No.: US 10,956,073 B2
(45) Date of Patent: Mar. 23, 2021

(54) DETERMINATION OF STORAGE AREA POOL INTO WHICH TO INCORPORATE SPARE STORAGE DEVICE

(71) Applicant: NEC Corporation, Tokyo (JP)

(72) Inventor: Masaya Suenaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/874,103

(22) Filed: Jan. 18, 2018

(65) Prior Publication Data

US 2018/0210672 A1      Jul. 26, 2018

(30) Foreign Application Priority Data

Jan. 25, 2017   (JP) .............................. JP2017-010817

(51) Int. Cl.
  *G06F 11/20*   (2006.01)
  *G06F 11/10*   (2006.01)
  *G06F 3/06*    (2006.01)

(52) U.S. Cl.
  CPC .......... *G06F 3/0644* (2013.01); *G06F 3/0604* (2013.01); *G06F 3/0614* (2013.01); *G06F 3/0689* (2013.01); *G06F 11/1076* (2013.01); *G06F 11/2094* (2013.01)

(58) Field of Classification Search
  CPC . G06F 3/0644; G06F 11/1076; G06F 2211/10
  See application file for complete search history.

(56) References Cited

U.S. PATENT DOCUMENTS

| | | | | |
|---|---|---|---|---|
| 6,571,354 B1 * | 5/2003 | Parks | .................... | G06F 11/008 714/6.32 |
| 8,880,801 B1 * | 11/2014 | Robins | ................ | G06F 12/0246 711/114 |
| 2015/0074452 A1 * | 3/2015 | Tsukahara | ............. | G06F 3/0619 714/6.23 |
| 2016/0041877 A1 | 2/2016 | Zhou et al. | | |

FOREIGN PATENT DOCUMENTS

| JP | 09330182 A | * 12/1997 | |
|---|---|---|---|
| JP | H09-330182 A | 12/1997 | |
| JP | 2000200157 A | * 7/2000 | .......... G06F 11/1076 |
| JP | 2004-171373 A | 6/2004 | |
| JP | 2007-241837 A | 9/2007 | |
| JP | 2010-128773 A | 6/2010 | |
| JP | 2015-052960 A | 3/2015 | |
| JP | 2016-038767 A | 3/2016 | |

OTHER PUBLICATIONS

Japanese Office Action for JP Application No. 2017-010817 dated Feb. 26, 2019 with English Translation.

* cited by examiner

*Primary Examiner* — Matthew M Kim
*Assistant Examiner* — Indranil Chowdhury

(57) ABSTRACT

A management device includes: a determiner that, in a plurality of storage area pools each of that has a configuration including a plurality of storage devices, determines a storage area pool into that a spare storage device is incorporated for adding an area storing data; and a manager that incorporates the spare storage device into the determined storage area pool.

7 Claims, 14 Drawing Sheets

Fig. 2

| POOL No. | PD No. | Error State | | | Pool State |
|---|---|---|---|---|---|
| | | Check Condition | Timeout | Other Error | |
| POOL#0 | PD#00 | PC00 | PT00 | PE00 | State #0 |
| | PD#01 | PC01 | PT01 | PE01 | |
| | ... | ... | ... | ... | |
| | PD#0n | PC0n | PT0n | PE0n | |
| ... | ... | ... | ... | ... | ... |
| POOL #m | PD#m0 | PCm0 | PTm0 | PEm0 | State #m |
| | ... | ... | ... | ... | |
| ... | ... | ... | ... | ... | ... |

Fig. 4

| PD#0 | PD#1 | PD#2 | PD#3 | PD#4 | PD#5 |
|------|------|------|------|------|------|
| D00 | D01 | D02 | D03 | P0 | Q0 |
| D11 | D12 | D13 | P1 | Q1 | D10 |
| D22 | D23 | P2 | Q2 | D20 | D21 |
| D33 | P3 | Q3 | D30 | D31 | D32 |
| P4 | Q4 | D40 | D41 | D42 | D43 |
| Q5 | D50 | D51 | D52 | D53 | P5 |
| D60 | D61 | D62 | D63 | P6 | Q6 |

| SD#0 |
|------|
| S00 |
| S01 |
| S02 |
| S03 |
| S04 |
| S05 |
| S06 |

+

⇩

| PD#0 | PD#1 | PD#2 | PD#3 | PD#4 | PD#5 | SD#0 |
|------|------|------|------|------|------|------|
| S00 | D01 | D02 | D03 | P0 | Q0 | D00 |
| D11 | S01 | D13 | P1 | Q1 | D10 | D12 |
| D22 | D23 | S02 | Q2 | D20 | D21 | P2 |
| D33 | P3 | Q3 | S03 | D31 | D32 | D30 |
| P4 | Q4 | D40 | D41 | S04 | D43 | D42 |
| Q5 | D50 | D51 | D52 | D53 | S05 | P5 |
| D60 | D61 | D62 | D63 | P6 | Q6 | S06 |

| PD#0 | PD#1 | PD#2 | PD#3 | PD#4 | PD#5 | SD#0 |
|------|------|------|------|------|------|------|
| S00  | D01  | D02  | D03  | P0   | Q0   | D00  |
| D11  | S01  | D13  | P1   | Q1   | D10  | D12  |
| D22  | D23  | S02  | Q2   | D20  | D21  | P2   |
| D33  | P3   | Q3   | S03  | D31  | D32  | D30  |
| P4   | Q4   | D40  | D41  | S04  | D43  | D42  |
| Q5   | D50  | D51  | D52  | D53  | S05  | P5   |
| D60  | D61  | D62  | D63  | P6   | Q6   | S06  |

⇩

| PD#0 | PD#1 | PD#2 | PD#3 | PD#4 | PD#5 | SD#0 |
|------|------|------|------|------|------|------|
| D02  | D01  | D02  | D03  | P0   | Q0   | D00  |
| D11  | D13  | D13  | P1   | Q1   | D10  | D12  |
| D22  | D23  | S02  | Q2   | D20  | D21  | P2   |
| D33  | P3   | Q3   | Q3   | D31  | D32  | D30  |
| P4   | Q4   | D40  | D41  | D40  | D43  | D42  |
| Q5   | D50  | D51  | D52  | D53  | D51  | P5   |
| D60  | D61  | D62  | D63  | P6   | Q6   | D62  |

Fig. 6

| PD#0 | PD#1 | PD#2 | PD#3 | PD#4 | PD#5 | SD#0 |
|------|------|------|------|------|------|------|
| S00  | D01  | D02  | D03  | P0   | Q0   | D00  |
| D11  | S01  | D13  | P1   | Q1   | D10  | D12  |
| D22  | D23  | S02  | Q2   | D20  | D21  | P2   |
| D33  | P3   | Q3   | S03  | D31  | D32  | D30  |
| P4   | Q4   | D40  | D41  | S04  | D43  | D42  |
| Q5   | D50  | D51  | D52  | D53  | S05  | P5   |
| D60  | D61  | D62  | D63  | P6   | Q6   | S06  |

⇩

| PD#0 | PD#1 | PD#2 | PD#3 | PD#4 | PD#5 | SD#0 |
|------|------|------|------|------|------|------|
| D00  | D01  | D02  | D03  | P0   | Q0   | S00  |
| D11  | D12  | D13  | P1   | Q1   | D10  | S01  |
| D22  | D23  | P2   | Q2   | D20  | D21  | S02  |
| D33  | P3   | Q3   | D30  | D31  | D32  | S03  |
| P4   | Q4   | D40  | D41  | D42  | D43  | S04  |
| Q5   | D50  | D51  | D52  | D53  | P5   | S05  |
| D60  | D61  | D62  | D63  | P6   | Q6   | S06  |

| PD#0 | PD#1 | PD#2 | PD#3 | PD#4 | PD#5 |
|---|---|---|---|---|---|
| D00 | D01 | D02 | D03 | P0 | Q0 |
| D11 | D12 | D13 | P1 | Q1 | D10 |
| D22 | D23 | P2 | Q2 | D20 | D21 |
| D33 | P3 | Q3 | D30 | D31 | D32 |
| P4 | Q4 | D40 | D41 | D42 | D43 |
| Q5 | D50 | D51 | D52 | D53 | P5 |
| D60 | D61 | D62 | D63 | P6 | Q6 |

| SD#0 | SD#1 |
|---|---|
| S00 | S10 |
| S01 | S11 |
| S02 | S12 |
| S03 | S13 |
| S04 | S14 |
| S05 | S15 |
| S06 | S16 |

⇩

| PD#0 | PD#1 | PD#2 | PD#3 | PD#4 | PD#5 | SD#0 | SD#1 |
|---|---|---|---|---|---|---|---|
| S00 | S10 | D02 | D03 | P0 | Q0 | D00 | D01 |
| D11 | S01 | S11 | P1 | Q1 | D10 | D12 | D13 |
| D22 | D23 | S02 | S12 | D20 | D21 | P2 | Q2 |
| D33 | P3 | Q3 | S03 | S13 | D32 | D30 | D31 |
| P4 | Q4 | D40 | D41 | S04 | S14 | D42 | D43 |
| Q5 | D50 | D51 | D52 | D53 | S05 | S15 | P5 |
| D60 | D61 | D62 | D63 | P6 | Q6 | S06 | S16 |

| PD#0 | PD#1 | PD#2 | PD#3 | PD#4 | PD#5 | SD#0 | SD#1 |
|------|------|------|------|------|------|------|------|
| S00  | S10  | D02  | D03  | P0   | Q0   | D00  | D01  |
| D11  | S01  | S11  | P1   | Q1   | D10  | D12  | D13  |
| D22  | D23  | S02  | S12  | D20  | D21  | P2   | Q2   |
| D33  | P3   | Q3   | S03  | S13  | D32  | D30  | D31  |
| P4   | Q4   | D40  | D41  | S04  | S14  | D42  | D43  |
| Q5   | D50  | D51  | D52  | D53  | S05  | S15  | P5   |
| D60  | D61  | D62  | D63  | P6   | Q6   | S06  | S16  |

⇩

| PD#0 | PD#1 | PD#2 | PD#3 | PD#4 | PD#5 | SD#0 | SD#1 |
|------|------|------|------|------|------|------|------|
| S00  | D02  | D02  | D03  | P0   | Q0   | D00  | D01  |
| D11  | S01  | S11  | P1   | Q1   | D10  | D12  | D13  |
| D22  | D33  | S02  | S02  | D20  | D21  | P2   | Q2   |
| D33  | P3   | Q3   | S03  | Q3   | D32  | D30  | D31  |
| P4   | Q4   | D40  | D41  | S04  | D40  | D42  | D43  |
| Q5   | D50  | D51  | D52  | D53  | S05  | D51  | P5   |
| D60  | D61  | D62  | D63  | P6   | Q6   | S06  | D62  |

DETERMINATION OF STORAGE AREA POOL INTO WHICH TO INCORPORATE SPARE STORAGE DEVICE

This application is based upon and claims the benefit of priority from Japanese Patent Application No. 2017-0180817, filed on Jan. 25, 2017, the disclosure of which is incorporated herein in its entirety by reference.

TECHNICAL FIELD

The present invention relates to management of a storage device, and particularly relates to a management device, a management method and the like that manage a plurality of storage devices.

BACKGROUND ART

As a required amount of data increases, number of storage devices such as Hard Disk Drive (HDD) and Solid State Drive (SSD) that are used in an information processing system increase, and a storage capacity of each storage device increase. As increase of the above-mentioned number and capacity, an art of Redundant Arrays of Inexpensive Disks (RAID) is used when using the storage device such as HDD or the like in order to improve reliability and access performance of the storage device. According to RAID, it is possible to restore data that are held by a failed storage device (refer to, for example Japanese Patent Application Laid-Open Publication No. 2007-241837 (hereinafter, denoted as PTL (Patent Literature) 1), Japanese Patent Application Laid-Open Publication No. 2004-171373 (hereinafter, denoted as PTL 2), and Japanese Patent Application Laid-Open Publication No. 2010-128773 (hereinafter, denoted as PTL 3)).

The invention of PTL 1 is an invention to identify a failed storage device out of storage devices that compose a rank in RAID.

The invention of PTL 2 is an invention to detect a sign of failure in a physical disk device and to exchange a memory disk relating the physical disk.

The invention of PTL 3 is an invention to identify a disk having a high possibility that a failure occurs by using Self-Monitoring Analysis and Reporting Technology (SMART) in hard disk devices.

However, since the capacities of HDDs and SSDs enlarge, a time for restoring data is prolonged. Then, an art to reduce a restoration time is proposed (refer to Japanese Patent Application Laid-Open publication No. 2016-038767 (hereinafter, denoted as PTL 4)).

According to the invention of PTL 4, a storage area pool (POOL) that is a combination of physical storage devices (Physical Storage Device (PD)) is constructed. Furthermore, according to the invention of PTL 4, when constructing the storage area pool, a storage device for an area of data (an unused area in a job), volume of which will become vast in the future, is incorporated in each storage area pool. That is, according to the invention of PTL 4, a spare storage device (Spare Storage Device (SD)) is incorporated in each storage area pool as a spare area.

In the case of a normal process, access to data in the unused area is not generated. That is, the unused area has no contention with the normal process. Then, according to the invention of PTL 4, when restoring the data, the restoration time is shortened by using the unused area that is incorporated in the storage area pool in advance.

SUMMARY

However, according to the invention of PTL 4, it is necessary to incorporate the spare storage device in each storage area pool.

FIG. 14 is a diagram illustrating the spare storage device that is incorporated in each storage area pool in PTL 4. In FIG. 14, PD #xy (each of x and y is any numeral) is a storage device included in the pool. SD #pq (each of p and q is any numeral) is the spare storage device. However, the spare storage device is a device that is not used when reduction or the like does not occur. That is, the invention of PTL 4 has an issue that there are many unused storage devices in the normal state.

Since the invention of each of PTLs 1 to 3 is invention on each storage device, the invention of each of PTLs 1 to 3 cannot solve the above-mentioned issue of the spare storage device in the storage area pool.

An object of the present invention is to solve the above-mentioned issue, and to provide a management device and the like that reduce number of required spare storage devices.

A management device according to one aspect of the present invention includes: a determiner that, in a plurality of storage area pools each of that has a configuration including a plurality of storage devices, determines the storage area pool into that a spare storage device is incorporated for adding an area storing data; and a manager that incorporates the spare storage device into the storage area pool determined.

A management method for a management device according to one aspect of the present invention includes: determining the storage area pool into that a spare storage device is incorporated for adding an area storing data, in a plurality of storage area pools each of that has a configuration including a plurality of storage devices; and incorporating the spare storage device into the storage area pool determined.

A computer readable non-transitory recording medium according one aspect of the present invention embodies a program. The program causes a computer to perform a method. The method includes: determining the storage area pool into that a spare storage device is incorporated for adding an area storing data, in a plurality of storage area pools each of that has a configuration including a plurality of storage devices; and incorporating the spare storage device into the storage area pool determined.

BRIEF DESCRIPTION OF THE DRAWINGS

Exemplary features and advantages of the present invention will become apparent from the following detailed description when taken with the accompanying drawings in which:

FIG. 2 is a diagram illustrating an example of an error state;

FIG. 4 is a diagram for explaining incorporation of a spare area;

FIG. 6 is a diagram for explaining release of the spare area;

EXAMPLE EMBODIMENT

Figure 1:
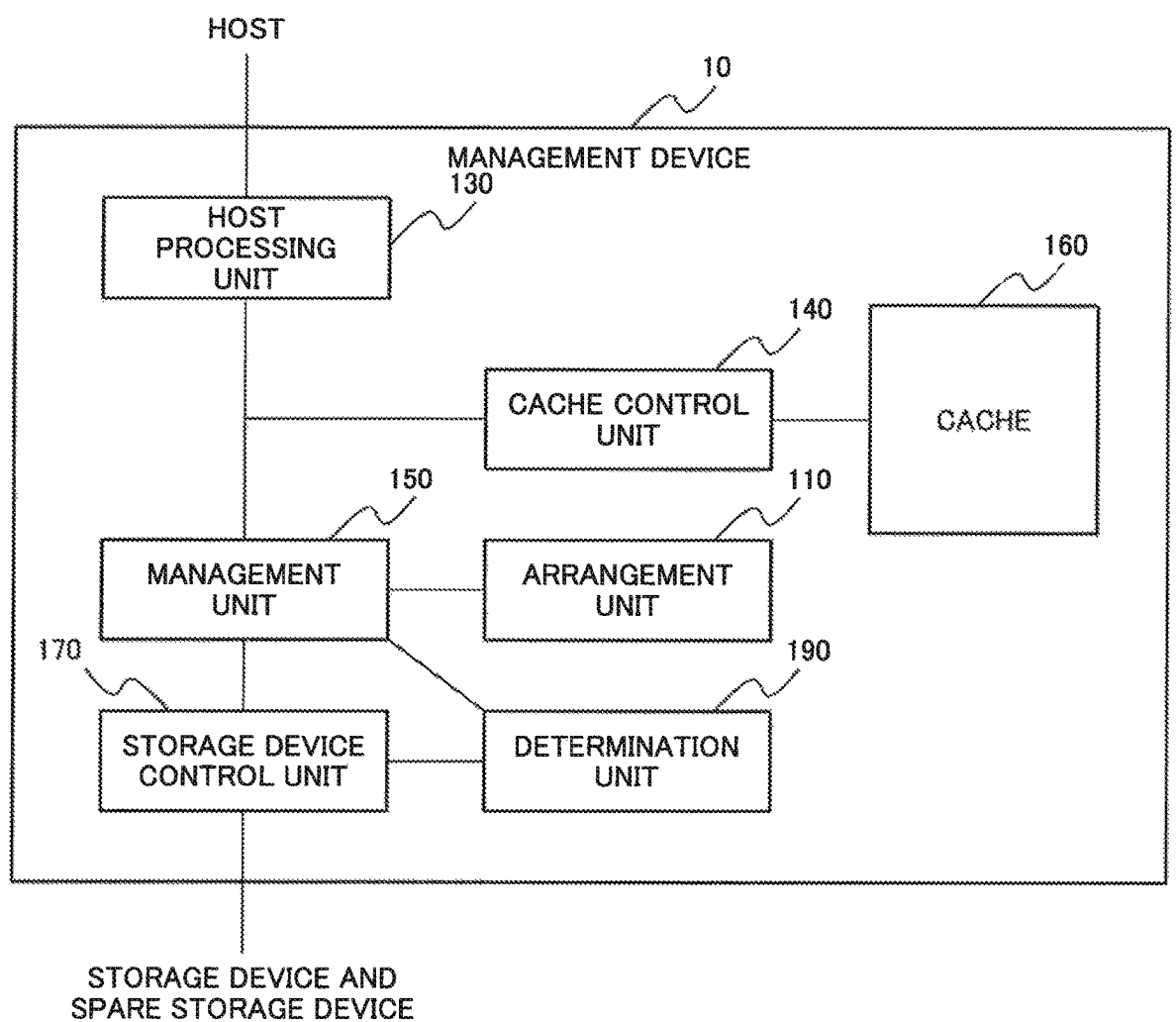
FIG. 1 is a block diagram illustrating an example of a configuration of a management device according to a first example embodiment.

Next, an example embodiment of the present invention will be explained with reference to drawings.

Each drawing is used for explaining the example embodiment of the present invention. However, the present invention is not limited to description of each drawing. Moreover, the same components in the drawings have the same signs, and repetitive explanations on the same components may be omitted in some cases. Moreover, in the drawings used for the following explanation, description on a component that has no relation to explanation of the present invention may be omitted and the component may not be illustrated in the drawing in some cases.

The following explanation will be provided by using a management device, which is connected with a host and manages a plurality of storage devices such as HDDs or SDDs, as each example embodiment. For example, the management device is a control device for a disk array. However, each example embodiment is not limited to the disk array.

First Example Embodiment

Hereinafter, a first example embodiment according to the present invention will be explained with reference to drawings. A management device 10 according to the first example embodiment manages transmission and reception of data between a host not illustrated in the drawing, and storage devices. Furthermore, the management device 10 manages a storage area pool that includes a plurality of the storage devices.

[Explanation of Configuration]

Firstly, a configuration of the management device 10 according to the first example embodiment will be explained with reference to the drawings.

FIG. 1 is a block diagram illustrating an example of the configuration of the management device 10 according to the first example embodiment.

As shown in FIG. 1, the management device 10 includes a host processing unit 130, a cache control unit 140, a management unit 150, a cache 160, a storage device control unit 170, a determination unit 190, and an arrangement unit 110.

The host processing unit 130 receives a command from the host. Then, the host processing unit 130 performs a process that is relating to the command.

When receiving a write command from the host, the host processing unit 130 stores write data in the cache 160 through the cache control unit 140, and reports completion of the command to the host. Then, the host processing unit 130 requests the management unit 150 to write the data, which are stored in the cache 160, into the storage device.

Moreover, when receiving a read command from the host, the host processing unit 130 reads data from the storage device, puts the read data into the cache 160, and transmits the read data to the host through the management unit 150, the storage device control unit 170, and/or the cache control unit 140.

As mentioned above, the host processing unit 130 processes transfer of data between the host and the cache 160.

The cache control unit 140 controls an operation of storing data in the cache 160. In further detail, the cache control unit 140 manages an address of the data that are stored in the cache 160.

The cache 160 stores the data under the control of the cache control unit 140. Furthermore, the cache 160 receives data, which is received from the host, from the host processing unit 130 and transmits data, which is transmitted to the host, to the host processing unit 130 under the control of the cache control unit 140. Moreover, the cache 160 transmits data to the storage device through the storage device control unit 170 and receives data from the storage device through the storage device control unit 170 under the control of the cache control unit 140.

The storage device control unit 170 controls and mediates data transfer between the cache 160 and the storage device based on a request issued by the management unit 150.

The management unit 150 manages the storage device by use of the storage device control unit 170. Specifically, the management unit 150 manages the storage device that stores the data received from the host.

Furthermore, the management unit 150 manages a plurality of the storage devices by using the storage area pool that has a configuration including a plurality of the storage devices.

Note that, in the present example embodiment, there is a case that the storage area pool includes a spare storage device, and there is another case that the storage area pool does not include the spare storage device as will be explained later.

Furthermore, the management unit 150 manages incorporation of the spare storage device into the storage area pool, and release of the spare storage device from the storage area pool based on determination executed by the determination unit 190. The spare storage device is a storage device for adding an area to store data in the storage area pool.

When incorporating the spare storage device, the management unit 150 requests the arrangement unit 110 to arrange a spare area. Moreover, when releasing the spare storage device, the management unit 150 requests the arrangement unit 110 to release the spare area. The spare area is an area for storing data, which are stored in the storage device and/or the spare storage device in which an error occurs, in order to cope with the error occurred in the storage device and/or the spare storage device.

The area means a unit for recording data in the storage device. In the present example embodiment, a size of the area has no limitation. For example, each area may be the minimum processing unit (for example, a sector) in the storage device, and may be a plurality of the processing units (for example, 4 sectors or 8 sectors).

Furthermore, the management unit 150 manages reduction (REDUCTION), which is caused by the error (ERROR) occurring in the storage device or the like, in the storage area pool.

The determination unit 190 determines the storage area pool into which the spare storage device is incorporated.

For example, when the management device 10 uses the spare storage device in order to increase a storage capacity, the determination unit 190 may determine the storage area pool, residual capacity (unused capacity) of which is less than a prescribed value, to be the storage pool into which the spare storage device is incorporated.

Alternatively, when the management device 10 adds the spare storage device as a storage device for evacuation at a time of occurrence of the error, the determination unit 190 may determine the storage area pool, into which the spare storage device is incorporated, based on an error state of the storage device included in the storage area pool.

Hereinafter, a case of determination based on the error state will be explained as an example. However, the present example embodiment is not limited to the following explanation.

The determination unit 190 monitors the error state of the storage device included in the storage area pool. For example, the determination unit 190 acquires the error state of the storage device through the storage device control unit 170. Then, the determination unit 190 calculates a state (referred to as "pool state") of the storage area pool based on the acquired error state. Afterward, the determination unit 190 determines the storage area pool, into which the space storage device is incorporated, based on the pool state.

FIG. 2 is a diagram illustrating an example of the error state. A first column of FIG. 2 indicates the storage area pool. A second column indicates the storage device included in each storage area pool. And, each of a third column to a fifth column indicates the error state in each storage device. That is, each row of FIG. 2 indicates the error state in each storage device (PD #00 or another) included in the storage area pool (POOL #0 or another). As an example of the error state, FIG. 2 indicates number of times of occurrence of the error. For example, a first row indicates three kinds of number of times of occurrence of the error in the storage device (PD #00) of the storage area pool (POOL #0). The specific number of times is as follows.

(1) Check condition: PC00 [times]
(2) Timeout: PT00 [times]
(3) Other errors: PE00 [times]

A sixth column indicates the pool state (State #0 or another), which is determined by the determination unit 190, for each storage area pool.

Then, the determination unit 190 determines the storage area pool, into which the spare storage device is incorporated, based on the pool state. For example, when using total number of the errors as the pool state, the determination unit 190 selects the storage area pools, number of which agrees with number of the spare storage devices, to be selected in an order of largeness of the total number of the errors, and determines the selected storage area pool as pool into which the spare storage device is incorporated.

However, the errors have different degrees of influence to a system. Then, the determination unit 190 may calculate the pool state by using weight relating to the error, in order to cope with the influence of the error.

For example, it is assumed that values of weight assigned to three kinds of the errors illustrated in FIG. 2 are "WC", "WT" and "WE" respectively. In detail, it is assumed that the values of weight WC, WT and WE are assigned to CHECK CONDITION, TIMEOUT and OTHER ERROR respectively.

Then, the determination unit 190 calculates the pool state by use of a calculation equation using the values of above-mentioned weight to the errors respectively. For example, the pool state (State #0) of the storage area pool (POOL #0) described at a top of the column "POOL No." in FIG. 2 is calculated as follows.

$$\text{State \#0} = WC \times (PC00 + PC01 + \ldots + PC0n) + WT \times (PT00 + PT01 + \ldots + OT0n) + WE \times (PE00 + PE01 + \ldots + PE0n)$$

There is a high possibility that the storage area pool, in which many errors occur, is caused the reduction. Therefore, as described above, the pool state, which is calculated by use of the error state, is an example of an index indicating the possibility that reduction is caused to the storage area pool. In the following explanation, it is assumed that "index" is a value indicating the possibility that the reduction is caused to the storage area pool. As the possibility of the reduction becomes high, the value of the index becomes large. However, as the possibility of the reduction becomes high, the value of the index may become small. When using this index, "large" should be replaced with "small" in the following determination.

Note that the index is not limited to the above-mentioned equation. For example, the index may be a value, which is not related to number of the storage devices, such as an arithmetical means other than the total number, and may be a value including a concept of time such as number of errors occurring from a present time until a past prescribed-time.

The determination unit 190 calculates the index value (possibility of occurrence of the reduction) of each storage area pool by using an equation such as the above-mentioned equation. Then, the determination unit 190 may determine the storage area pools, number of which agrees with number of the spare storage devices and which are selected in an order of largeness of the calculated index value, to be the storage area pool into which the spare storage device is incorporated.

Figure 3:
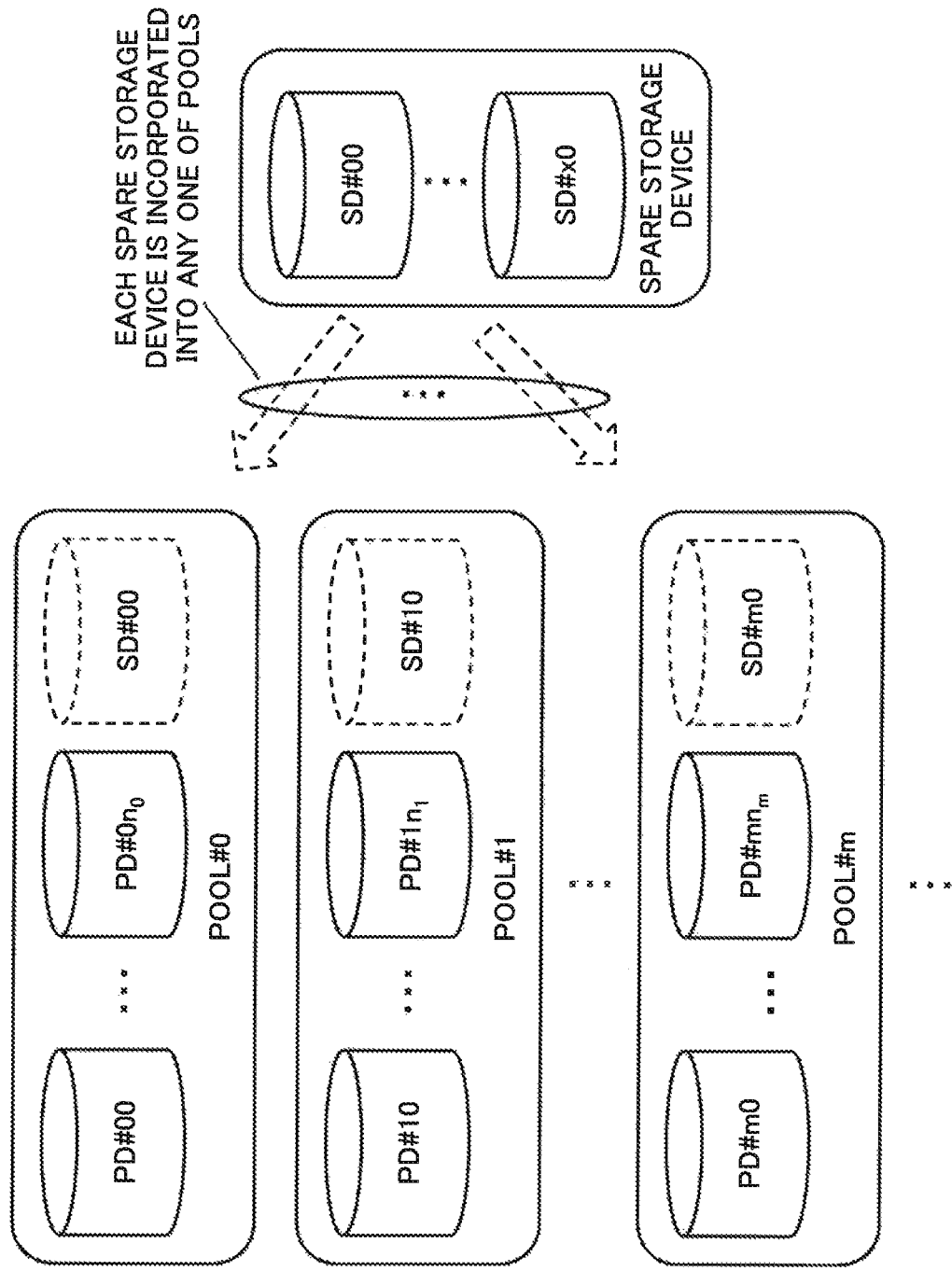
FIG. 3 is a diagram for explaining incorporation of a spare storage device.

FIG. 3 is a diagram for explaining incorporation of the spare storage device. As illustrated in FIG. 3, the determination unit 190 determines the storage area pool, into which the spare storage device (SD #x0) is incorporated, out of all of the storage area pools (POOL #0, . . . , POOL #m . . . (m is any integer)).

However, the determination method according to the present example embodiment is not limited to the above. For example, the determination unit 190 may select the storage area pools, whose calculated index values are larger than a prescribed threshold value, and may randomly determine the storage area pool, into which the spare storage device is incorporated, out of the selected storage area pools.

Note that the error state is changed. Therefore, it is desirable for the determination unit 190 to repeat the determination process in a prescribed cycle.

As will be explained later, when the storage area pool into which the spare storage device is incorporated is changed, the management unit 150 changes the spare area of the storage area pool, from which the spare storage device is released, and the spare area of the storage area pool, into which the spare storage device is incorporated, by using the arrangement unit 110.

When receiving an instruction that indicates to incorporate or release the spare area of the storage area pool from the management unit 150, the arrangement unit 110 incorporates or releases the spare area. The spare area incorporation method performed by the arrangement unit 110 is selected according to composition of the storage area pool.

Hereinafter, an example of incorporation or release of the spare area will be explained with reference to the drawings.

FIG. 4 is a diagram illustrating incorporation of the spare area. In FIG. 4, the storage devices PD #0 to PD #5 are the storage devices (for example, HDD or SDD) that compose the storage area pool.

An upper part of FIG. 4 illustrates areas of the storage devices composing the storage area pool, and areas of the spare storage device (SD #0). In the following explanation, it is assumed that RAID 6 is applied to the storage area pool. Therefore, number of parity is two (P and Q). However, the present example embodiment is not limited to RAID 6.

In FIG. 4, each row illustrates a stripe that is a logical set of data. Moreover, D00 to D63 are areas (for example, sector) to store data of each stripe. P0 to P6, and Q0 to Q6 are areas to store data (parity) for restoration. S00 to S06 are the spare areas.

For the spare storage device (SD #0) determined by the determination unit 190 to be incorporated into the storage area pool, the management unit 150 requests the arrange unit 110 to arrange the spare area in the storage area pool.

As illustrated in a lower part of FIG. 4, the arrangement unit 110 arranges the spare area in the storage area pool in such a way that the spare areas are dispersed in the storage devices and the spare storage device which are included in the storage area pool.

For example, "arrow from S00 to D00" of a first row in the lower part of FIG. 4 indicates that the data D00 stored in the storage devicePD #0 move to the spare storage device SD #0. After movement of the data, the area of the storage device PD #0 is used as the spare area (S00). Similarly, arrows illustrated in a second row to a sixth row indicate movement of data. As mentioned above, the arrangement unit 110 disperses the spare areas in the storage devices and the spare storage device that are included in the storage area pool.

According to the dispersion illustrated in FIG. 4, the spare areas are dispersed in all of the storage devices and the spare storage device. However, the dispersion performed by the arrangement unit 110 is not limited to the example illustrated in FIG. 4. As the dispersion of the spare areas, the arrangement unit 110 at least should disperse the spare areas in devices whose number is larger than number of the spare storage devices. For example, the arrangement unit 110 may disperse the spare areas in the spare storage device and one storage device.

When the error occurs in the storage device, the spare area is used for storing data in place of the area of the device in which the error occurs. In this case, transfer of the data to all of the spares areas is generated. When dispersing the spare areas in a plurality of the storage devices and a plurality of the spare storage devices, accesses at that time are dispersed in a plurality of the devices. As a result, an access load in each device is decreased. Therefore, it is desirable for the arrangement unit 110 to disperse the spare areas in the most possible devices.

Data in the arranged spare area should be set according to a system in which the management device 10 is used. For example, the area of S00 of the storage device (PD #0) illustrated in the lower part of FIG. 4, which is set as the new spare area, may be initialized along the system, and any operation may not be executed to the area if the system has no necessity.

Figure 5:
FIG. 5 is a diagram illustrating a state in which reduction occurs.

FIG. 5 is a diagram illustrating a state in which the reduction occurs. An upper part of FIG. 5 indicates that the error occurs in the storage device PD #2. Then, the management unit 150 moves data of the storage device PD #2, in which the error occurs, to the spare area by use of the storage device control unit 170.

A lower part of FIG. 5 indicates a state after movement of the data. The management unit 150 moves the data of the storage device PD #2 to the spare area by use of the storage device control unit 170. However, there is a case that the data of the storage device PD #2 cannot be read since the storage device PD #2 is in the error state. In this case, the management unit 150 regenerates the data based on the other storage devices and the spare storage device, and stores the regenerated data in the spare area. In this case, the management unit 150 uses the parity (P and Q) appropriately.

As a result, it is possible to use the storage device pool with excluding the storage device (PD #2) in which the error has occurred (usage in a reduction state).

When the faulty storage device (PD #2) is exchanged for a new storage device as a result of maintenance or the like, the management unit 150 manages restoration of the data in the new storage device (PD #2). Specifically, the management unit 150 moves the data in a direction opposite to the direction of movement of the data illustrated in the lower part of FIG. 5, and consequently returns each storage device to the normal state illustrated in the lower part of FIG. 4.

FIG. 6 is a diagram for explaining release of the spare area.

When releasing the spare device from the storage area pool, the management unit 150 instructs the arrangement unit 110 to release the spare area.

When receiving the instruction that indicates release of the spare area from the management unit 150, the arrangement unit 110 moves data that are stored in the spare storage device (SD #0) to the storage devices (PD #0 to PD #5) included in the storage area pool, as illustrated in an upper part of FIG. 6. For example, a first row in the upper part of FIG. 6 indicates that data D00 stored in the spare storage device (SD #0) move to the storage device PD #0. The arrangement unit 110 moves all of data that are stored in the spare storage device (SD #0).

A lower part of FIG. 6 illustrates a state in which the spare area is released. As shown in the lower part of FIG. 6, the operation of releasing the spare area is an operation of collecting the spare area into the spare storage device.

Note that, also in the case of FIG. 6, the data of the area, which is set as the spare area in the spare storage device, should be set according to the system using the management device 10 like the case of FIG. 4.

After releasing the spare area, the management unit 150 releases the spare storage device from the storage area pool.

[Explanation of Operation]

Next, an operation will be explained with reference to drawings.

Firstly, an operation for determining the storage area pool, into which the spare storage device is incorporated, will be explained.

Figure 7:
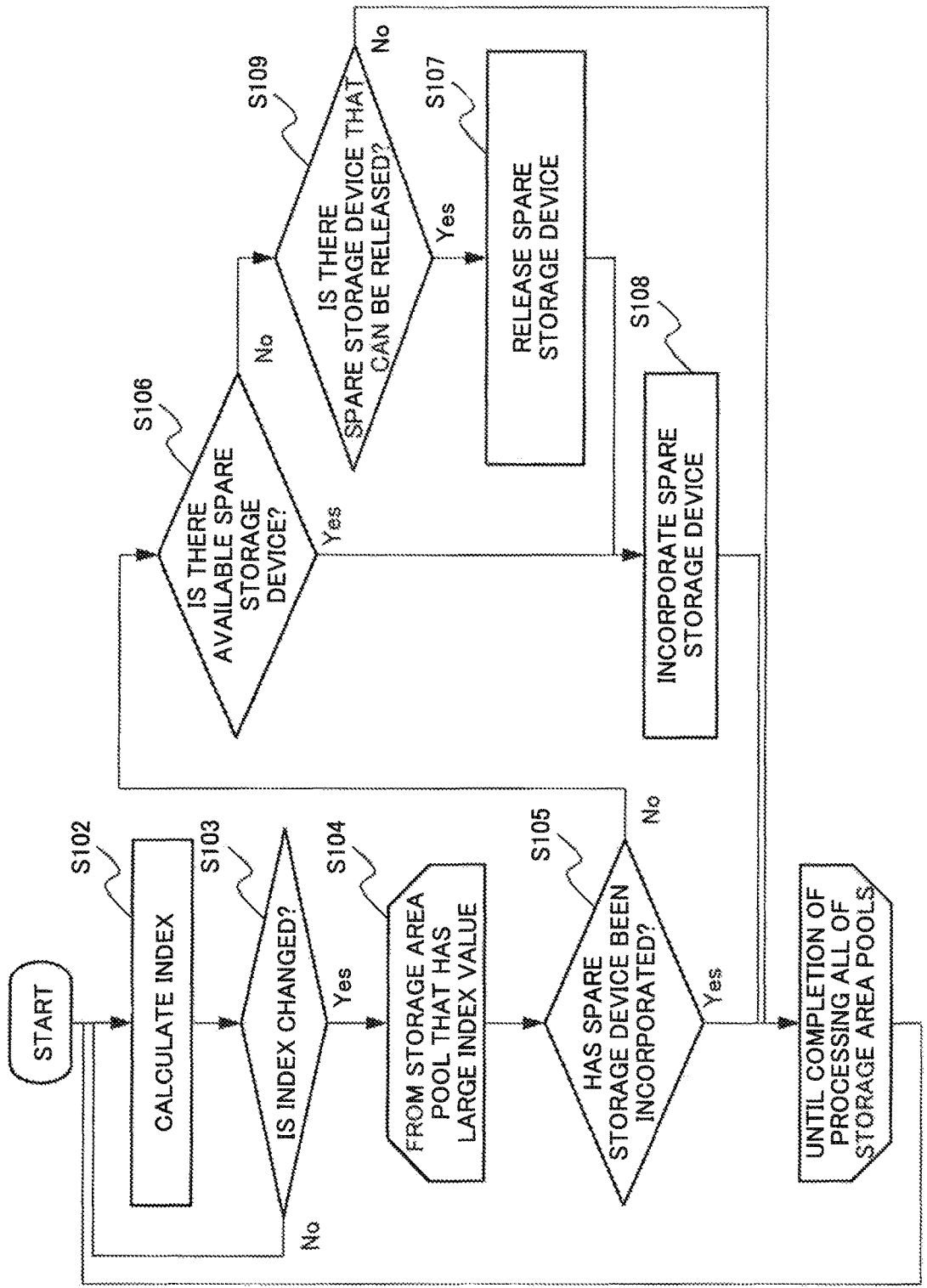
FIG. 7 is a flowchart illustrating an example of an operation to incorporate the spare storage device into a storage area pool.

FIG. 7 is a flowchart illustrating an example of an operation for incorporating the spare storage device into the storage area pool.

The determination unit 190 periodically acquires the error state of the storage device that is included in the storage area pool.

Then, the determination unit 190 calculates the pool states of all storage area pool based on the acquired error state (Step S102). In the following explanation, the index is used as the pool state.

The determination unit 190 determines whether there is the storage area pool whose calculated index value is changed (Step S103).

When there is no storage area pool whose index value is changed (No in Step S103), the determination unit 190 returns the operation to Step S102. That is, the management device 10 repeats the determination process executed by the determination unit 190.

When there is the storage area pool whose index value is changed (Yes in Step S103), the determination unit 190 repeats the following process to all of the storage area pools in an order of largeness of the index value (Step S104).

The determination unit 190 selects the storage area pool whose index value is the largest among the un-processed storage area pools. Then, the determination unit 190 determines whether the spare storage device is incorporated into the selected storage area pool (Step S105).

When the spare storage device is incorporated (Yes in Step S105), the determination unit 190 proceeds to processing the next storage area pool.

When the spare storage device is not incorporated (No in Step S105), the determination unit 190 determines whether there is the available spare storage device (Step S106). Concretely, the determination unit 190 inquires of the management unit 150 whether there is the available spare storage device (for example, unused spare storage device).

When there is the spare storage device that can be incorporated (Yes in Step S106), the determination unit 190 requests the management unit 150 to incorporate the spare storage device into the storage area pool that is a target of the process. The management unit 150 incorporates the spare storage device by using the arrangement unit 110 (Step S108).

When there is no available spare storage device (No in Step S106), the determination unit 190 performs as follows.

The index indicates a possibility of the reduction. Therefore, the management device 10 assigns the spare storage device to the storage area pool in the order of largeness of the index value of the storage area pool. Since the determination unit 190 processes the storage area pool in the order of largeness of the index value of the storage area pool, the index value of the storage area pool that is a target of the process is equal to or larger than the index value of the un-processed storage are pool. When there is no available spare storage device, the determination unit 190 extracts the storage area pool, to which the spare storage device is assigned, from the un-processed storage area pools. Then, the determination unit 190 requests the management unit 150 to assign the spare storage device of the extracted storage area pool to the storage area pool that is the target of the process.

Specifically, the management device 10 performs as follows.

When there is no available spare storage device (No in Step S106), the determination unit 190 determines whether there is the storage area pool from which the spare storage device can be released (Step S109). Specifically, the determination unit 190 determines whether there is the storage area pool, into which the spare storage device is incorporated, among the un-processed storage area pools.

When there is no storage area pool, the determination unit 190 determines that there is no storage area pool from which the spare storage device is released (No in Step S109). In this case, the determination unit 190 proceeds to processing the next storage area pool.

When there is the storage area pool (Yes in Step 109), the determination unit 190 selects the storage area pool, from which the spare storage device is released, out of the un-processed storage area pools. For example, the determination unit 190 extracts the storage area pool, into which the spare storage device is incorporated, from the un-processed storage area pools, and selects the storage area pool that has the smallest index value among the selected storage area pools. Then, the determination unit 190 requests the management unit 150 to release the spare storage device of the selected storage area pool (Step S107).

Afterward, the determination unit 190 requests the management unit 150 to incorporate the released spare storage device into the storage area pool that is the target of the process (Step S108). After incorporation of the released spare storage device, the determination unit 190 processes the next storage area pool.

Figure 8:
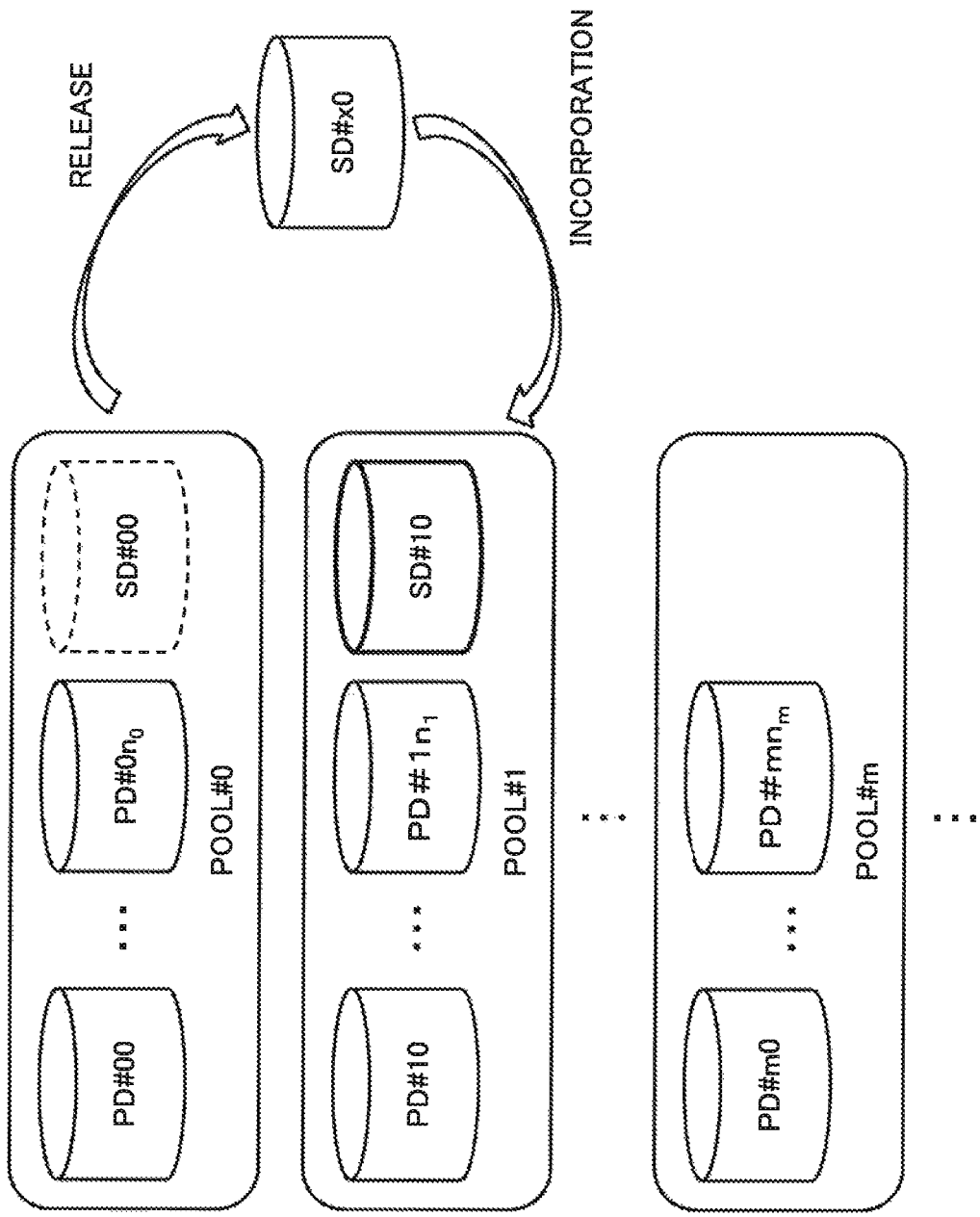
FIG. 8 is a diagram for explaining rearrangement of the spare storage device.

FIG. 8 is a diagram for explaining rearrangement of the spare storage device. In FIG. 8, the spare storage device (SD #x0 in FIG. 8) is incorporated into the first storage area pool (POOL #0). It is assumed that the index value of the second storage area pool (POOL #1) is larger than the index value of the first storage area pool. In this case, the determination unit 190 determines to incorporate the spare storage device, which has been incorporated into the first storage area pool, into the second storage area pool.

When the spare storage device (SD #x0) is incorporated into the POOL #0, the spare storage device (SD #x0) is the spare storage device of the POOL #0. Therefore, the spare storage device, which is incorporated into the POOL #0, is denoted as "SD #00" in FIG. 8. Then, when the spare storage device (SD #x0) is released from the first storage area pool (POOL #0) and is incorporated into the second storage area pool (POOL #1), the spare storage device (SD #x0) is the spare storage device of the POOL #1. Therefore, the spare storage device, which is incorporated into the POOL #1, is denoted as "SD #10".

The management device 10 repeats the above-mentioned process to all of storage area pools.

When processing for all of the storage area pools is completed, the determination unit 190 returns the operation to Step S102. That is, the management device 10 repeats the process.

FIG. 7 illustrates the process performed to all of the storage area pools. Here, the management device 10 incorporates the spare storage device into the storage area pool in the order of largeness of the index value of the storage area pool. Therefore, when the spare storage devices are incorporated into the storage area pools whose number agrees with number of the spare storage devices, the spare storage device is no longer incorporated into the storage area pool. That is, the management device 10 incorporates the spare storage devices into the storage area pools, number of which agrees with number of the spare storage devices, in the order of largeness of the index value of the storage area pool. Therefore, for example, the management device 10 may repeat the operation illustrated in FIG. 7 not to all of the storage area pools but to the storage area pools, number of which agrees with number of the spare storage devices.

As mentioned above, the operation of the management device 10 is not limited to the operation illustrated in FIG. 7.

Next, an operation to update the error state and the value of weight assigned to the error will be explained with reference to the drawings.

Figure 9:
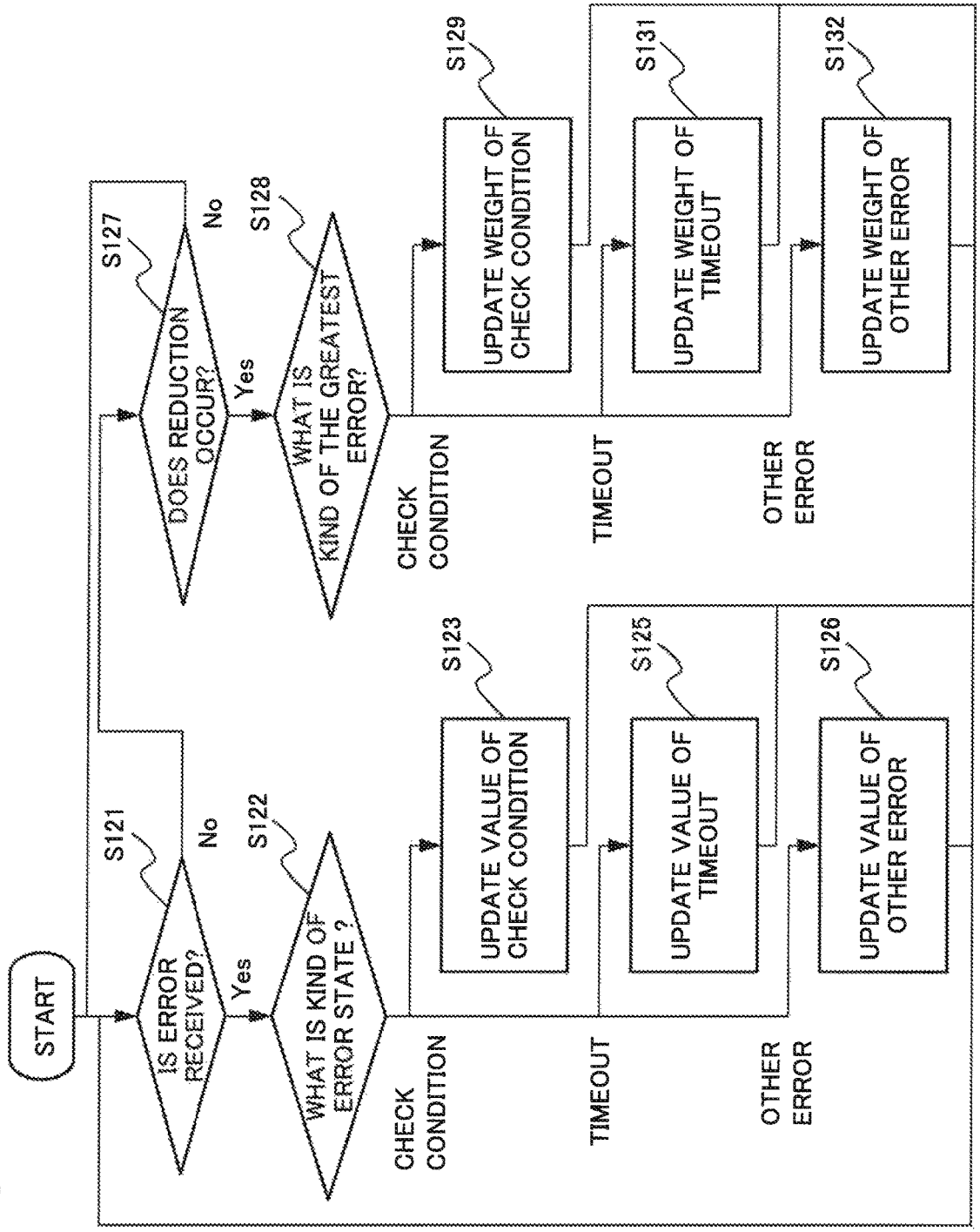
FIG. 9 is a flowchart illustrating an example of an operation to update the error state.

FIG. 9 is a flowchart illustrating an example of the operation to update the error state.

When detecting the error in the storage device, the storage device control unit 170 notifies the determination unit 190 of the error state. Alternatively, the determination unit 190 may inquire of the storage device control unit 170 the error state.

In the following explanation, it is assumed that the errors are "CHECK CONDITION", "TIMEOUT" and "OTHER ERROR". However, the error in the management device 10 according to the present example embodiment is not limited to the above-mentioned errors. The management device 10 according to the present example embodiment may detect other errors, and may include "CHECK CONDITION" and/or "TIMEOUT" in the other errors.

The determination unit 190 repeats the following operation. As will be explained in the following, the determination unit 190 respectively executes different operation each of cases when receiving the notice on the error state from the storage device control unit 170 and when not receiving the notice on the error state.

Firstly, the determination unit 190 determines whether or not receiving the error state (Step S121).

When receiving the error state (Yes in Step S121), the determination unit 190 determines a kind of the received error state (Step S122).

Then, the determination unit 190 updates the error state of the storage device in which the error occurs. Specifically, the determination unit 190 performs as follows.

When the error state is "CHECK CONDITION", the determination unit 190 updates the error state of "CHECK CONDITION" (for example, number of times of occurrence of the error) (Step S123).

When the error state is "TIMEOUT", the determination unit 190 updates the error state of "TIMEOUT" (for example, number of times of occurrence of the error) (Step S125).

When the error state is "OTHER ERROR" (that is, other than "CHECK CONDITION" and "TIMEOUT"), the determination unit 190 updates the error state of "OTHER ERROR" (Step S126). Also in this case, the error state of "OTHER ERROR" is number of times of occurrence of the error.

After updating the error state, the determination unit 190 returns to Step S121.

When not receiving the error state (No in Step S121), the determination unit 190 determines whether there is the storage area pool that newly transits to a state of reduction as a result of the error (Step S127). Concretely, the determination unit 190 inquires of the management unit 150 whether new reduction occurs.

When the reduction does not occur (No in Step S127), the determination unit 190 returns to Step S121. That is, the determination unit 190 repeats the process.

When the reduction occurs (Yes in Step S127 Yes), the determination unit 190 updates the value of weight that is used for calculating the index value of the reduced storage area pool. Concretely, the determination unit 190 increases the value of weight of the error that causes the reduction.

For example, it is estimated that the error, whose number of times of occurrence is the largest, is a cause of the reduction. Then, the determination unit 190 may perform as follows.

The determination unit 190 determines a kind of the error state whose number of times of occurrence is the largest (referred to as "largest error") among the error states in the storage area pool in which the reduction occurs (Step S128).

When the largest error is "CHECK CONDITION," the determination unit 190 enlarges the value of weight assigned to "CHECK CONDITION" (Step S129). For example, the determination unit 190 increases the value of weight (WC) assigned to "CHECK CONDITION" that is used in explanation of FIG. 2.

When the largest error is "TIMEOUT", the determination unit 190 enlarges the value of weight assigned to "TIMEOUT" (Step S131). For example, the determination unit 190 increases the value of weight (WT) assigned to "TIMEOUT" that is used in explanation of FIG. 2.

When the largest error is "OTHER ERROR" (that is, other than "CHECK CONDITION" and "TIMEOUT"), the determination unit 190 enlarges the value of weight assigned to "OTHER ERROR" (Step S132). For example, the determination unit 190 increases the value of weight (WE) assigned to "OTHER ERROR" that is used in explanation of FIG. 2.

An amount of increase in each value of weight has no limitation. Each value of weight may be increased by one every time, and may be increased by a prescribed value every time.

However, the cause of reduction is not always related to number of times of occurrence. Therefore, operations of the determination unit 190 may be different from the above. For example, there is an error that causes the reduction by only one time occurrence such as disorder in communication. A value of weight assigned to the above-mentioned serious error is initially larger than usual other values of weight. Therefore, the determination unit 190 may not update the initially large value of weight.

After updating the value of weight, the determination unit 190 returns to Step S121. That is, the determination unit 190 repeats the process.

In the above explanation, the management device 10 incorporates one spare storage device into each storage area pool. However, number of the spare storage devices that the management device 10 incorporates into the storage area pool is not limited to one. The management device 10 may incorporate two or more spare storage devices into the storage area pool.

Figure 10:
FIG. 10 is a diagram for explaining incorporation using two spare storage devices.

FIG. 10 is a diagram for explaining incorporation using two spare storage devices.

In FIG. 10, PD #0 to PD #5 are the storage devices (for example, HDD or SDD) composing the storage area pool.

An upper part of FIG. 10 illustrates the storage area pool and two spare storage devices (SD #0 and #1).

Each row of FIG. 10 indicates the stripe that is a logical set of data. D00 to D63 are areas (for example, sector) in which data in each stripe are stored. P0 to P6, and Q0 to Q6 are areas in which data (for example, parity) for restoration are stored. S00 to S16 are the spare areas.

As illustrated in a lower part of FIG. 10, the arrangement unit 110 arranges the spare area in the storage area pool in such a way that the spare areas are dispersed in the storage devices and the spare storage device which are included in the storage area pool.

For example, "arrow from S00 to D00", which is illustrated at an upper part of a first row in the lower part of FIG. 10, indicates that the data D00 stored in the storage device PD #0 move to the spare storage device SD #0. After movement of the data, an area of the storage device PD #0 is used as the spare area (S00).

"Arrow from S10 to D11", which is illustrated at a lower part of the first row, indicates that the data D10 stored in the storage device PD #1 move to the spare storage device SD #1. After movement of the data, an area of the storage device PD #1 is used as the spare area (S10).

Similarly, arrows illustrated in a second row to a sixth row indicate movement of data. Note that, in the pool of sixth row, the arrangement unit 110 firstly moves data from the storage device PD #5 to the spare storage device SD #0, and then moves data from the storage device SD #0 to the spare storage device SD #1. As a result, the data (P5) stored in the storage device PD #5 is moved to the spare storage device SD #1.

As mentioned above, the arrangement unit 110 disperses the spare areas in the storage devices included in the storage area pool.

The incorporation method of the spare area performed by the arrangement unit 110 is not limited to the above. The arrangement unit 110 may use another incorporation method. For example, the arrangement unit 110 may incorporate the spare area according to a type of RAID used by the management device 10.

Figure 11:
FIG. 11 is a diagram illustrating a state when the reduction occurs in a state illustrated in a lower part of FIG. 10.

FIG. 11 is a diagram illustrating a state when the reduction occurs in the state illustrated in the lower part of FIG. 10. An upper part of FIG. 11 illustrates that the error occurs in the storage device PD #2. Then, the management unit 150 moves data of the storage device PD #2, in which the error occurs, to the spare area by using the storage device control unit 170.

A lower part of FIG. 11 illustrates a state after movement of the data. For data of an area in which data cannot be read from the storage device PD #2, the management unit 150 regenerates the data based on data of other storage devices, and stores the regenerated data in the spare area.

As a result, the storage area pool is available even in the reduction state. Moreover, the state illustrated in FIG. 11 includes a set of the spare areas (S00 to S06). Therefore, even when an error occurs in one more device out of the storage devices or the spare storage devices, it is possible to operate the storage area pool, which is in the state illustrated in the lower part of FIG. 11, in the reduction state in which the data are moved to the spare area.

When the storage device (PD #2) in which the error occurs is exchanged for the new storage device (PD #2) as a result of maintenance or the like, the management unit 150 manages restoration of the data in the new storage device (PD #2).

[Explanation of Effect]

Next, an effect of the present example embodiment will be explained.

The management device 10 according to the first example embodiment can achieve an effect of reducing number of the required spare storage devices.

The reasons are as follows.

In a plurality of the storage area pools constructed with a plurality of the storage devices, the determination unit 190 determines the storage area pool into which the spare storage device is incorporated for adding the area storing data. The management unit 150 incorporates the spare storage device into the determined storage area pool.

That is, since the management device 10 incorporates the spare storage device into the determined storage area pool, the management device 10 can reduce number of the required spare storage devices in such a way that the number is smaller than number of the storage area pools.

Furthermore, the determination unit 190 of the management device 10 determines the storage area pool, into which the spare storage device is incorporated, based on the error states of the storage devices included in the storage area pools. Specifically, the management device 10 incorporates the spare storage device into the storage area pool which has a high possibility that the reduction occurs. Even when the reduction occurs, the storage area pool into which the spare storage device is incorporated can maintain the data area and the parity area by use of the spare area. That is, the management device 10 incorporates the spare storage device into the storage area pool which has the high possibility that the reduction occurs. As a result, the management device 10 can improve reliability even when the reduction occurs.

Furthermore, the management device 10 can achieve an effect that degradation in performance at a time when the error occurs is decreased.

The reasons are as follows.

The arrangement unit 110 dispersively arranges the spare areas, which store the data stored in the storage device and the spare storage device according to the error states of the storage device and the spare storage device, in the storage device and the spare storage device.

When incorporating the spare storage device into the storage area pool, the management unit 150 requests the arrangement unit 110 to arrange the spare area.

Therefore, even when an error occurs in the storage device or the spare storage device and consequently the spare area is used, accesses to data are dispersed in a plurality of the storage devices and a plurality of the spare storage devices that are included in the storage area pool.

Furthermore, the management device 10 can achieve an effect of improving reliability of determination on the possibility that the reduction occurs.

The reasons are as follows.

The determination unit 190 determines the storage area pool, into which the spare storage device is incorporated, based on the error state of the storage device. The determination unit 190 may use number of times of occurrence of the error as the error state. Furthermore, the determination unit 190 may determines the storage area pool, based on a plurality of the error states and the values of weight that are relating to a plurality of the error states respectively. That is, the determination unit 190 can realize determination in which the prescribed error is regarded as important.

Furthermore, when the reduction occurs in the storage area pool, the determination unit 190 increases the value of weight that is relating to the error state causing the reduction. That is, the determination unit 190 determines such a way that the error causing the reduction is regarded as more important.

[Outline of Configuration]

The above-mentioned management device 10 is configured the following.

For example, each unit of the management device 10 may be configured of a hardware circuit.

Alternatively, each unit of the management device 10 may be configures with a plurality of devices connected with each other through a network.

Figure 12:
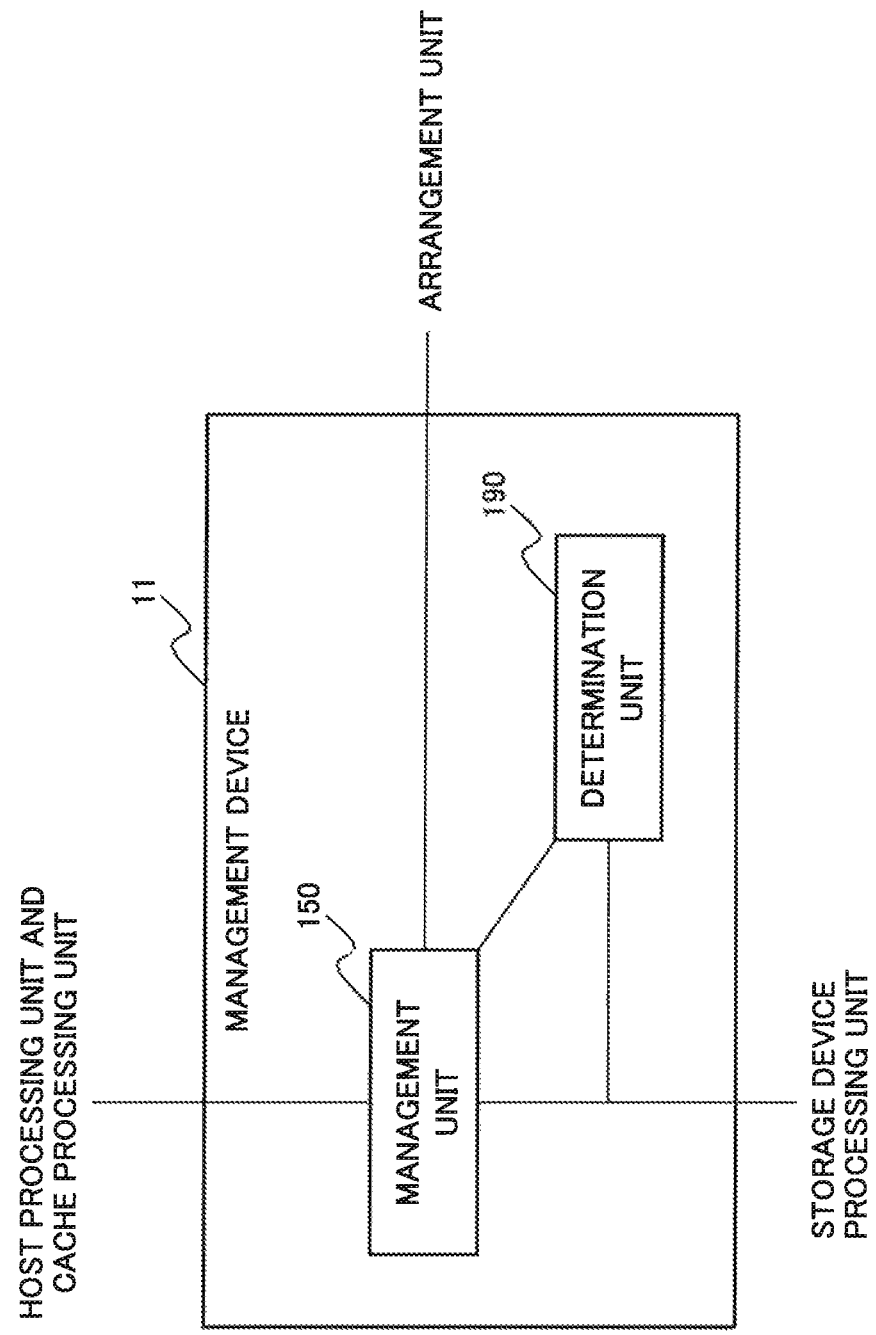
FIG. 12 is a block diagram illustrating an example of a configuration of a management device that is an example of an outline of the first example embodiment.

FIG. 12 is a block diagram illustrating an example of a configuration of a management device 11 that is an example of the outline of the first example embodiment.

The management device 11 includes the management unit 150 and the determination unit 190.

Each element of the management device 11 is connected to elements that perform like the host processing unit 130, the cache control unit 140 and the storage device control unit 170 through a network or the like not illustrated in the drawing. Furthermore, the management unit 150 is connected to an element that performs like the arrangement unit 110. Then, each elements of the management device 11 performs like each element included in the management device 10.

The management device 11 that has the above-mentioned configuration can achieve an effect that is the same as the effect that the management device 10 achieves.

The reasons are as follows.

In a plurality of the storage area pools to be configured by using a plurality of the storage devices, the determination unit 190 determines the storage area pool into which the spare storage device is incorporated for adding the area storing data. The management unit 150 incorporates the spare storage device into the determined storage area pool.

As mentioned above, the management device 11 incorporates the spare storage device into the determined storage area pool and consequently can reduce number of the required spare storage devices and can make the number smaller than number of the storage area pools.

Here, the configuration of the management device 11 is the minimum configuration of the present example embodiment.

[Hardware Configuration]

Hardware configurations of the management device 10 and the management device 11 will be explained by using the management device 10.

A plurality of elements of the management device 10 may be composed of one block of hardware.

Alternatively, the management device 10 may be realized as a computer device that includes CPU (Central Processing Unit), ROM (Read Only Memory) and RAM (Random Access Memory). Furthermore, the management device 10 may be realized as a computer device that includes an input and output connection circuit (IOC: Input and Output Circuit) and a network interface circuit (NIC: Network Interface Circuit) in addition to the above-mentioned configuration.

Figure 13:
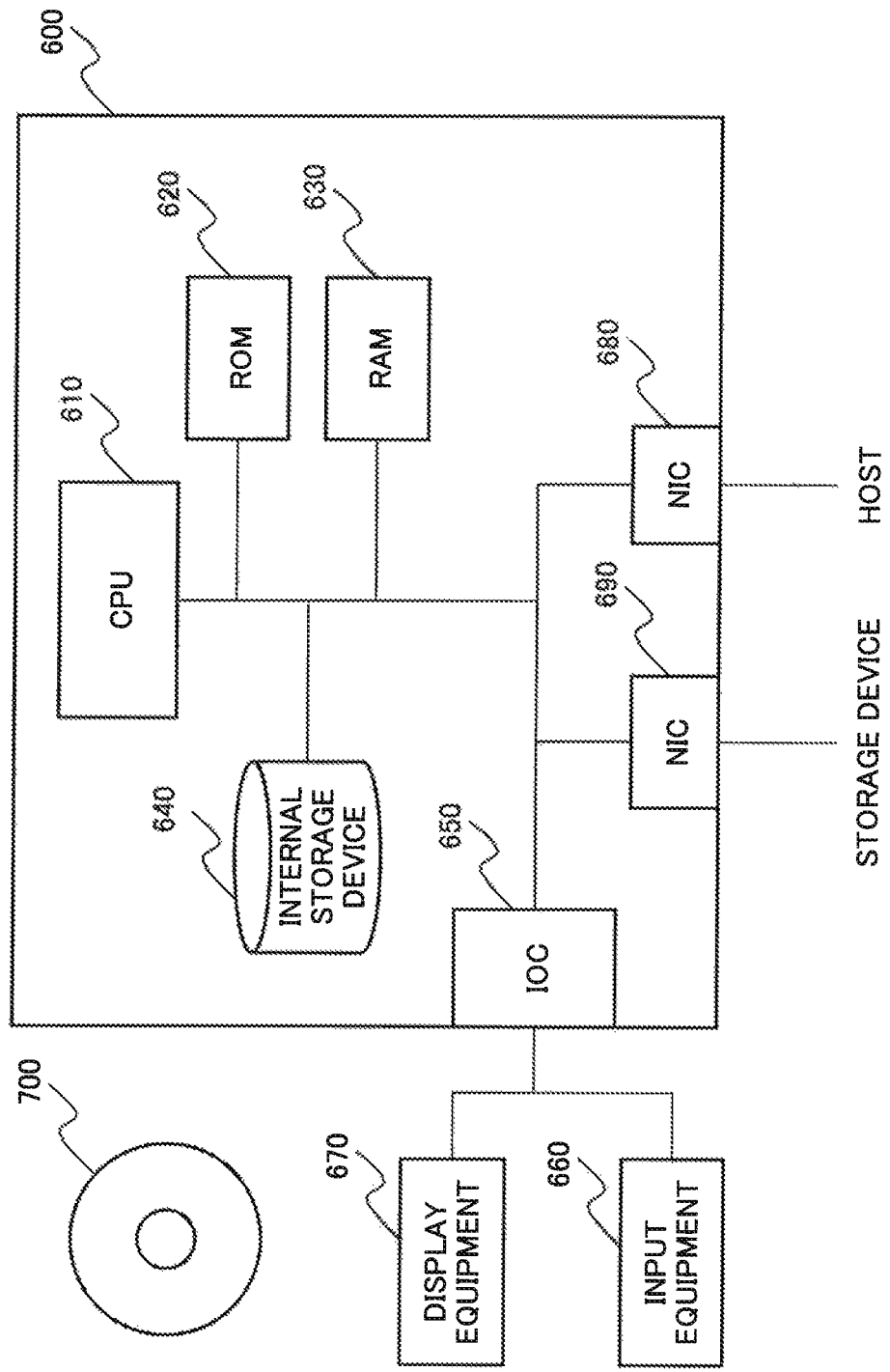
FIG. 13 is a block diagram illustrating an example of a configuration of an information processing device that is an example of a hardware configuration.
Figure 14:
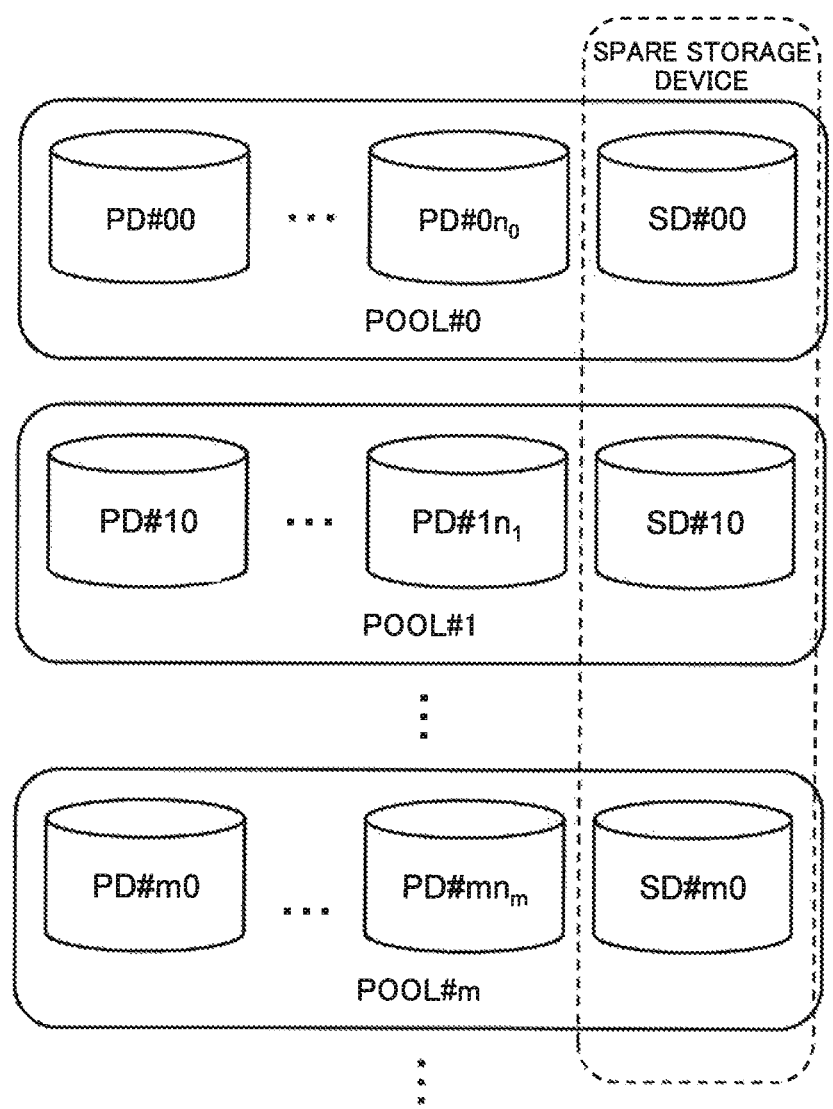
FIG. 14 is a diagram illustrating a spare storage device of each pool described in PTL 4.

FIG. 13 is a block diagram illustrating an example of a configuration of an information processing device 600 which is an example of the hardware configuration.

The information processing device 600 includes a CPU 610, a ROM 620, a RAM 630, an internal storage device 640, an IOC 650, a NIC 680 and a NIC 690, and configures the computer device.

The CPU 610 reads a program from the ROM 620. Then, the CPU 610 controls the RAM 630, the internal storage device 640, the IOC 650 and the NIC 680 based on the read program. The computer device including the CPU 610 controls these components, and realizes each of functions for performing as the host processing unit 130, the cache control unit 140, the cache 160, the management unit 150, the arrangement unit 110, the determination unit 190 and the storage device control unit 170 that are illustrated in FIG. 1.

When realizing each function, the CPU 610 may use the RAM 630 or the internal storage device 640 as a temporary storage medium for the program.

Alternatively, a storage medium 700 may store the program in such a way that the program can be read by the computer, and the CPU 610 may read the program stored in the storage medium 700 by using a storage medium reading device not illustrated in the drawing. Alternatively, the CPU 610 may receive the program from an external device not illustrated in the drawing through the NIC 680 or the NIC 690, may store the program in the RAM 630, and may execute functions based on the stored program.

The ROM 620 stores the program that the CPU 610 executes, and fixed data. The ROM 620 is, for example, P-ROM (Programmable-ROM) or a flash ROM.

The RAM 630 temporarily stores the program that the CPU 610 executes, and data. The RAM 630 may perform as the cache 160. The RAM 630 is, for example, D-RAM (Dynamic-RAM).

The internal storage device 640 stores a program and data which the information processing device 600 stores for a long time. Moreover, the internal storage device 640 may perform as a temporary storage device of the CPU 610. The internal storage device 640 is, for example, a hard disk device, a magneto-optical disk device, SSD (Solid State Drive) or a disk array device.

The ROM 620 and the internal storage device 640 are non-volatile (non-transitory) storage media. Meanwhile, the RAM 630 is a volatile (transitory) storage medium. The CPU 610 can execute functions based on a program that is stored by the ROM 620, the internal storage device 640 or the RAM 630. That is, the CPU 610 can execute functions by using the non-transitory storage medium or the transitory storage medium.

The IOC 650 mediates data between the CPU 610 and an input equipment 660, and between the CPU 610 and a display equipment 670. The IOC 650 is, for example, an IO interface card or a USB (Universal Serial Bus) card. Furthermore, the IOC 650 may use a wired method using USB or the like, and may use a wireless method in place of the wired method.

The input equipment 660 is equipment that receives an input instruction from an operator of the information processing device 600. The input equipment 660 is, for example, a keyboard, a mouse or a touch panel.

The display equipment 670 is equipment that displays information to the operator of the information processing device 600. The display equipment 670 is, for example, a liquid crystal display.

The NIC 680 and the NIC 690 relay data exchange with an external device, which is not illustrated in the drawing, through the network. Specifically, the NIC 680 relays the data exchange with the host. The NIC 690 relays the data exchange with the storage device. Each of the NIC 680 and the NIC 690 is, for example, a Fiber Channel card or a LAN (Local Area Network) card. Furthermore, the NIC 680 and the NIC 690 may use the wired method and may use the wireless method in place of the wired method.

The information processing device 600 having the above-mentioned configuration can achieve an affect that is the same as the effect that the management device 10 achieves.

The reason is that the CPU 610 of the information processing device 600 can realize functions, which are the same as the functions of the management device 10, based on the program.

According to the present invention, it is possible to achieve an effect of reducing number of the required spare storage devices.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A management device comprising:
a memory, and
at least one processor coupled to the memory,
the at least one processor performing operations, the operations comprising:

in a plurality of storage area pools each of that has a configuration including a plurality of storage devices, determining the storage area pool into which a spare storage device is incorporated for adding an area storing data; and incorporating the spare storage device into the storage area pool determined, wherein the operations further comprise determining the storage area pool, residual capacity of which is less than a prescribed value, to be the storage area pool into which the spare storage device is incorporated, and determining whether the spare storage device is incorporated into the determined storage area pool, when the spare storage device is not incorporated into the determined storage area pool, determining whether there is an available spare storage device, when there is no available spare storage device extracting a storage area pool, from which the storage device is released, from un-processed storage area pools, incorporating the spare storage device of the extracted storage area pool into the determined storage area pool, determining the storage area pool based on a pool state of the storage area pool, the storage area pool state equal to a sum of a number of times that a plurality of error states occurred in the storage devices of the storage area pool respectively weighted with a plurality of weighting values corresponding to the error states, when reduction that is a state in which an error occurs in at least one of the storage devices in the storage area pool occurs in the storage area pool, increasing the weighting value of the error state that caused the reduction, and determining the error state that caused the reduction as the error state having occurred a maximum number of times.

2. The management device according to claim 1, wherein the operations further comprise:

dispersively arranging spare areas, which store data stored in the storage device and the spare storage device, in the storage device and the spare storage device according to the error states of the storage device and an error state of the spare storage device, wherein when incorporating the spare storage device into the storage area pool, arranging the spare area.

3. The management device according to claim 2, wherein the operations further comprise determining the storage area pool, into which the spare storage device is incorporated, based on the error state of the storage device.

4. The management device according to claim 3, wherein the operations further comprise using number of times of occurrence of an error of the storage device as the error state.

5. The management device according to claim 1, further comprising:

a cache that stores data;

wherein the operations further comprise:

processing a command issued from a host; and controlling the cache the storage device and the spare storage device.

6. A management method for a management device, the method comprising:

in a plurality of storage area pools each of that has a configuration including a plurality of storage devices, determining the storage area pool into which a spare storage device is incorporated for adding an area storing data, as the storage area pool having residual capacity less than a prescribed value;

determining whether the spare storage device is incorporated into the determined storage area pool;

when the spare storage device is not incorporated into the determined storage area pool, determining whether there is an available spare storage device, when there is no available spare storage device, extracting a storage area pool, from which the storage device is released, from un-processed storage area pools, requesting to incorporate the spare storage device of the extracted storage area pool into the determined storage area pool, wherein the storage area pool is determined based on a pool state of the storage area pool, the storage area pool state equal to a sum of a number of times that a plurality of error states occurred in the storage devices of the storage area pool respectively weighted with a plurality of weighting values corresponding to the error states, when reduction that is a state in which an error occurs in at least one of the storage devices in the storage area pool occurs in the storage area pool, the weighting value of the error state that caused the reduction is increased, and the error state that caused the reduction is determined as the error state having occurred a maximum number of times.

7. A computer readable non-transitory recording medium embodying a program, the program causing a computer to perform a method, the method comprising:

in a plurality of storage area pools each of that has a configuration including a plurality of storage devices, determining the storage area pool into which a spare storage device is incorporated for adding an area storing data, as the storage area pool having residual capacity less than a prescribed value; and incorporating the spare storage device into the storage area pool determined;

determining whether the spare storage device is incorporated into the determined storage area pool;

when the spare storage device is not incorporated into the determined storage area pool, determining whether there is an available spare storage device, when there is no available spare storage device, extracting a storage area pool, from which the storage device is released, from un-processed storage area pools, and requesting to incorporate the spare storage device of the extracted storage area pool into the determined storage area pool, wherein the storage area pool is determined based on a pool state of the storage area pool, the storage area pool state equal to a sum of a number of times that a plurality of error states occurred in the storage devices of the storage area pool respectively weighted with a plurality of weighting values corresponding to the error states, when reduction that is a state in which an error occurs in at least one of the storage devices in the storage area pool occurs in the storage area pool, the weighting value of the error state that caused the reduction is increased, and the error state that caused the reduction is determined as the error state having occurred a maximum number of times.

* * * * *